US012339412B2

(12) United States Patent
Alali et al.

(10) Patent No.: US 12,339,412 B2
(45) Date of Patent: Jun. 24, 2025

(54) METHOD AND SYSTEM FOR DETERMINING WAVEFIELD COMPONENTS USING INDEPENDENT COMPONENT ANALYSIS

(71) Applicant: SAUDI ARABIAN OIL COMPANY, Dhahran (SA)

(72) Inventors: Abdulmohsen Alali, Dammam (SA); Yazeed Altowairqi, Dhahran (SA); Constantinos Tsingas, Dhahran (SA); Ali M. Jadhar, Saihat (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 344 days.

(21) Appl. No.: 18/046,488

(22) Filed: Oct. 13, 2022

(65) Prior Publication Data

US 2024/0125961 A1 Apr. 18, 2024

(51) Int. Cl.
*G01V 1/34* (2006.01)
*E21B 44/00* (2006.01)
(Continued)

(52) U.S. Cl.
CPC .............. *G01V 1/345* (2013.01); *E21B 44/00* (2013.01); *E21B 49/00* (2013.01); *G01V 1/282* (2013.01); *G01V 1/301* (2013.01); *G01V 2210/64* (2013.01); *G01V 2210/65* (2013.01); *G01V 2210/74* (2013.01)

(58) Field of Classification Search
None
See application file for complete search history.

(56) References Cited

U.S. PATENT DOCUMENTS 8,908,471 B2 * 12/2014 Jiao .................. G01V 1/303
367/21
9,651,695 B2 * 5/2017 Lu .................... G01V 1/36
(Continued)

FOREIGN PATENT DOCUMENTS

CN 107688201 A 2/2018
CN 108415077 B 2/2021

OTHER PUBLICATIONS

Bharadwaj, Pawan et al., "Deblending random seismic sources via independent component analysis"; SEG Technical Program Expanded Abstracts 2017; pp. 4898-4902; 2017 (5 pages).
(Continued)

*Primary Examiner* — Elias Desta
(74) *Attorney, Agent, or Firm* — Osha Bergman Watanabe & Burton LLP (57) ABSTRACT

A method may include determining various migrated azimuthal dip-angle gathers based on a migration function and seismic data from a seismic survey regarding a geological region of interest. The method may further include determining various partial dip-angle images using the migrated azimuthal dip-angle gathers. The method may further include determining various azimuthal bins that include the partial dip-angle images. The method may further include determining various wavefield components using an independent component analysis (ICA) function and the partial dip-angle images among the azimuthal bins. The method may further include determining a geological feature within the geological region of interest using the wavefield components.

20 Claims, 7 Drawing Sheets

(51) Int. Cl.
*E21B 49/00* (2006.01)
*G01V 1/28* (2006.01)
*G01V 1/30* (2006.01)

(56) References Cited

U.S. PATENT DOCUMENTS

| | | | |
|---|---|---|---|
| 11,231,517 B2* | 1/2022 | Sugiura | E21B 7/062 |
| 2007/0274155 A1 | 11/2007 | Ikelle | |
| 2010/0186950 A1 | 7/2010 | Neelamani et al. | |
| 2017/0038490 A1 | 2/2017 | Hu | |
| 2022/0043175 A1 | 2/2022 | Liu et al. | |

OTHER PUBLICATIONS

Burnett, William A. et al., "Seismic diffraction interpretation at Piceance Creek"; Interpretation; vol. 3, Issue 1; pp. SF1-SF14; Feb. 2015 (14 pages).

Dafni, Raanan et al., "Using principal component analysis to decouple seismic diffractions from specular reflections"; SEG Technical Program Expanded Abstracts 2020; pp. 2958-2962; 2020 (5 pages).

Lubo-Robles, David et al., "Independent component analysis for reservoir geomorphology and unsupervised seismic facies classification in the Taranaki Basin, New Zealand"; Interpretation; vol. 7, Issue 3; pp. SE19-SE42; Aug. 2019 (24 pages).

Serfaty, Yuval et al., "Wavefield separation via PCA and deep learning in the Local Angle Domain"; SEG Technical Program Expanded Abstracts 2017; pp. 991-995; 2017 (5 pages).

Da Costa Filho, Carlos A. et al., "Multiple attenuation through independent component analysis: a case study"; 13th International Congress of the Brazilian Geophysical Society & Expogef, Rio de Janeiro, Brazil, Aug. 26-29, 2013; pp. 1435-1438; 2013 (4 pages).

Li, Chuangjian et al., "Separating and imaging diffractions of seismic waves in the full-azimuth dip-angle doman"; Journal of Geophysics and Engineering; vol. 17; Issue 2; pp. 339-356; Apr. 2020 (18 pages).

Van Der Baan, Mirko, "PP/PS Wavefield separation by independent component analysis"; Geophysical Journal International; vol. 166, Issue 1; pp. 339-348; Jul. 2006 (10 pages).

* cited by examiner

METHOD AND SYSTEM FOR DETERMINING WAVEFIELD COMPONENTS USING INDEPENDENT COMPONENT ANALYSIS

BACKGROUND

Various seismic processing operations are performed on seismic data from a survey to convert time-based seismic data into a depth representation of a subsurface. For example, seismic processing operations may include surface multiple filtering and other seismic data correction operations. Likewise, seismic processing may also include application of seismic inversion techniques and migration algorithms to enhance the subsurface understanding.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes determining, by a computer processor, various migrated azimuthal dip-angle gathers based on a migration function and seismic data from a seismic survey regarding a geological region of interest. The method further includes determining, by the computer processor, various partial dip-angle images using the migrated azimuthal dip-angle gathers. The method further includes determining, by the computer processor, various azimuthal bins that include the partial dip-angle images. The method further includes determining, by the computer processor, various wavefield components using an independent component analysis (ICA) function and the partial dip-angle images among the azimuthal bins. The method further includes determining, by the computer processor, a geological feature within the geological region of interest using the wavefield components.

In general, in one aspect, embodiments relate to a system that includes a control system and a seismic interpreter that includes a computer processor. The seismic interpreter is coupled to the control system. The seismic interpreter determines various migrated azimuthal dip-angle gathers based on a migration function and seismic data from a seismic survey regarding a geological region of interest. The seismic interpreter determines various partial dip-angle images using the migrated azimuthal dip-angle gathers. The seismic interpreter determines various azimuthal bins that includes the partial dip-angle images. The seismic interpreter determines various wavefield components using an independent component analysis (ICA) function and the partial dip-angle images among the azimuthal bins. The seismic interpreter determines a geological feature within the geological region of interest using the wavefield components. The control system transmits a command during a drilling operation based on the geological feature.

In general, in one aspect, embodiments relate to a non-transitory computer readable medium storing instructions executable by a computer processor, the instructions determine various migrated azimuthal dip-angle gathers based on a migration function and seismic data from a seismic survey regarding a geological region of interest. The instructions further determine various partial dip-angle images using the migrated azimuthal dip-angle gathers. The instructions further determine various azimuthal bins that include the partial dip-angle images. The instructions further determine various wavefield components using an independent component analysis (ICA) function and the partial dip-angle images among the azimuthal bins. The instructions further determine a geological feature within the geological region of interest using the wavefield components.

In some embodiments, an ICA model is obtained that includes a mixing matrix corresponding to an imaged location in the geological region of interest. The wavefield components may be determined using the ICA function to determine a solution to the ICA model and the partial dip-angle images. The ICA function may be a statistics function. In some embodiments, a migrated azimuthal dip-angle gather among the migrated azimuthal dip-angle gathers corresponds to a plurality of seismic contributions at an imaged location in the geological region of interest. The migrated azimuthal dip-angle gather may be a function of time and dip angles for a subsurface reflector. In some embodiments, the wavefield components include a reflection component, a first random noise component, a coherent noise component, a second random noise component, and a seismic lineament component for diffractions. In some embodiments, the migration function is a Kirchhoff depth migration function. In some embodiments, the geological feature corresponds to a diffraction event that is selected from a group consisting of a fault, a fracture, a channel, a rough edge of a salt body, and a karst section. In some embodiments, a predetermined well path is determined, using the geological feature, through the geological region of interest. A command may be transmitted using a control system to perform a drilling operation based on the predetermined well path. In some embodiments, a presence of hydrocarbons in the geological region of interest are determined using the geological feature. In some embodiments, the seismic data regarding the geological region of interest are acquired using a seismic surveying system.

In light of the structure and functions described above, embodiments disclosed herein may include respective means adapted to carry out various steps and functions defined above in accordance with one or more aspects and any one of the embodiments of one or more aspect described herein.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using independent component analysis (ICA) techniques to determine various wavefield components from dip-angle data. In some embodiments, an ICA function is applied to various dip-angle stacks within azimuthal bins corresponding to different survey azimuths. The output of the analysis function may include multiple independent components that describe the seismic wavefield observed in the seismic data. Using one or more ICA functions for different azimuths, for example, subtle geological features may be determined within a geological region of interest.

Furthermore, seismic wave diffractions in the subsurface may provide information regarding local discontinuities in the subsurface. These local discontinuities may not be discovered using typical seismic data processing and/or reflection data analysis techniques. More specifically, some local discontinuities may have no significant offset in the vertical direction but may vary according to azimuth. Thus, independent component analysis of migrated dip-angle data may identify these local discontinuities by distinguishing between different wavefield components, such as coherent noise components, random noise components, reflection components, and seismic lineament components (i.e., diffraction components) within an analyzed seismic wavefield. Thus, an ICA function may use a particular ICA model to isolate different wavefield components in order to compare a wavefield component of interest (e.g., seismic lineament component) with conventional reflection data.

In some embodiments, independent component analysis provides a geological feature separator using different directional volumes. For example, seismic data may be migrated into azimuthal-dip-angle gathers in time or depth domain, where the migrated dip-angle data is organized into partial dip-angle stacks or partial dip-angle images. As such, the migrated dip-angle data may be stacked according to different dip-angle ranges and different azimuth values. The ranges of dip angles and azimuth values may be based on the specific types of diffraction events being investigated. Independent component analysis functions may produce different data volumes that are sensitive to different types of wavefield components, such as reflections, random noise, and diffracted waves.

Figure 1:
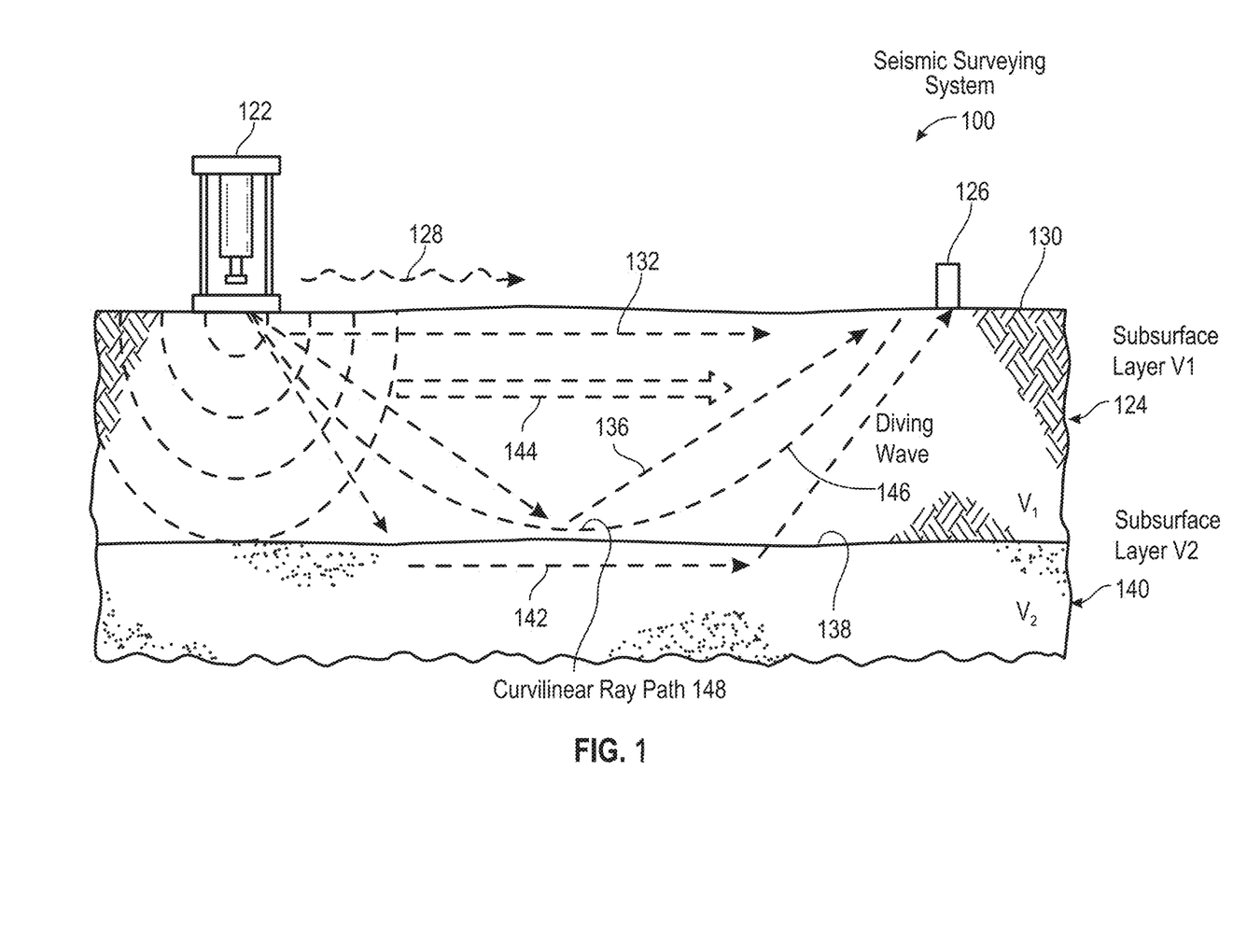
FIGS. 1 and 2 show systems in accordance with one or more embodiments.

Turning to FIG. 1, FIG. 1 shows a schematic diagram in accordance with one or more embodiments. As shown in FIG. 1, FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), refracting wave (142), or diving wave (146), through a subsurface layer V1 (124). Pressure waves generated by the seismic source (122) may travel along several paths through a subsurface layer V1 (124) at a velocity Vi for detection at a number of seismic receivers (126) along the line of profile. Likewise, velocity may refer to multiple velocity types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a velocity $V_1$, while subsurface layer (140) has a velocity $V_2$. In words, different subsurface layers may correspond to different velocity values. In particular, a velocity may refer to the speed that a pressure wave travels through a medium, e.g., diving wave (146) that makes a curvilinear ray path (148) through subsurface layer (124). Velocity may depend on a particular medium's density and elasticity as well as various wave properties, such as the frequency of an emitted pressure wave. Where a velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the velocity $V_1$ through the subsurface layer (124) to the seismic receivers (126).

Turning to refracted pressure waves and diving pressure waves, the seismic source (122) may also generate a refracted wave (i.e., refracting wave (142)) that is refracted at the subsurface interface (138) and travels along the subsurface interface (138) for some distance as shown in FIG. 1 until traveling upwardly to the seismic receivers (126). As such, refracted pressure waves (e.g., refracting wave (142)) may be analyzed to map the subsurface layers (subsurface layer V1 124, subsurface layer V2 140). For example, a refracted wave is a wave that a portion of ray path is along an interface of a reflector as show in refracting wave (142) in FIG. 1 (i.e., refraction exists only when $V_2 > V_1$). On the other hand, a diving wave may be generated where velocities are gradually increasing with depth at a gradient (e.g., diving wave (146)), such that the diving wave may turn back along curvilinear ray path. Likewise, the apex of a diving wave may be consistent with a reflected seismic wave in a common midpoint (CMP) gather.

Furthermore, in analyzing seismic data acquired using the seismic surveying system (100), seismic wave propagation may be approximated using rays. For example, reflected waves (e.g., reflected wave (136)) and diving waves (e.g., diving wave (146)) may be scattered at the subsurface interface (138). In FIG. 1, for example, the diving wave (146) may exhibit a ray path of a wide angle that resembles a reflected wave in order to map the subsurface. Using diving waves, for example, a velocity model for an underlying subsurface may be generated that describes the velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a minimum that satisfies a predetermined criterion. For example, the optimization algorithm may be "linearized" and while achieving a "minimum," there may be no guarantee that it is a global minimum rather than a local minimum. Thus, it may be a simplification commonly adapted in solving inverse problems that works when a respective objective function is convex.

With respect to velocity models, a velocity model may map various subsurface layers based on velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types changes, such as interfaces between different subsurface layers. In some embodiments, a velocity model is updated using one or more tomographic updates to adjust the velocity boundaries in the velocity model.

Figure 2:
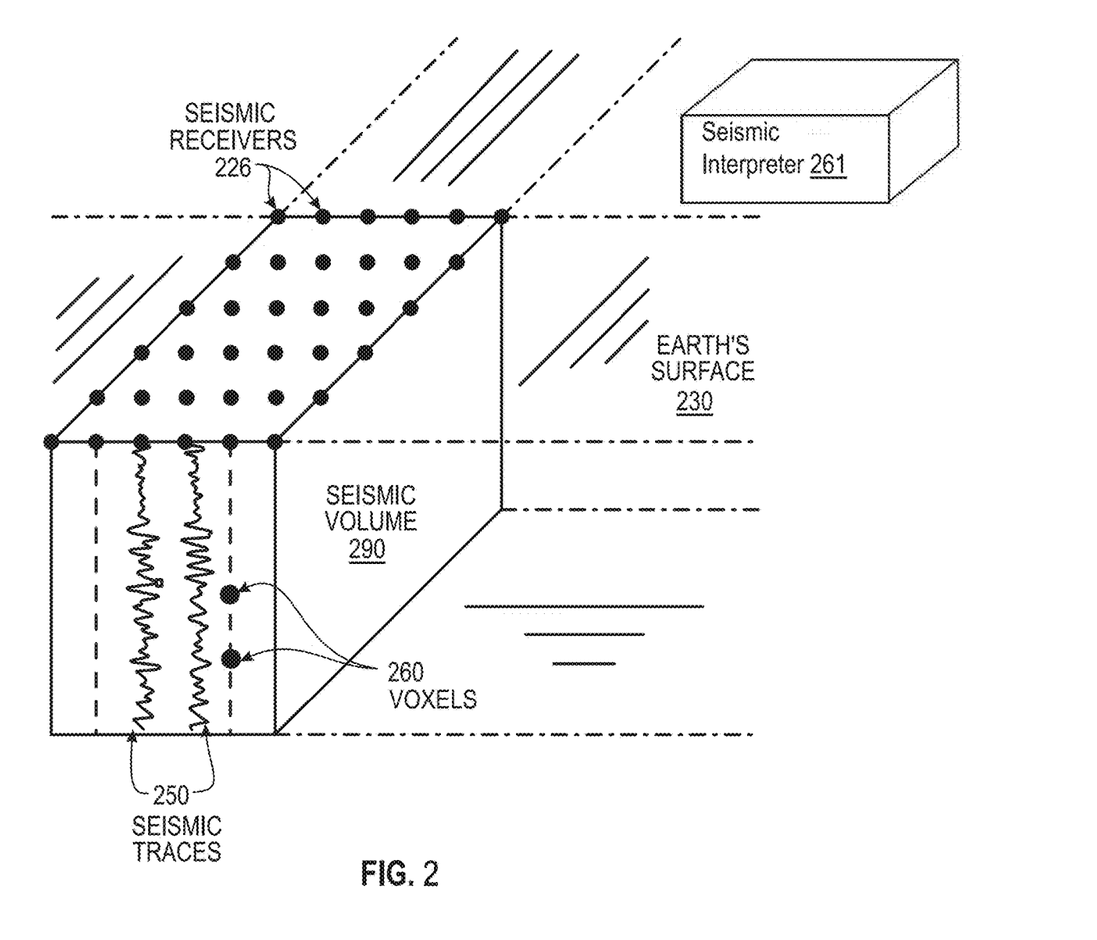

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (e.g., a surface 230). More specifically, a seismic volume (290) may be a cubic dataset of seismic traces. In particular, seismic data may have up to four spatial dimensions, one temporal dimension (i.e., related to the actual measurements stored in the traces), and possibly another temporal dimension related to time-lapse seismic surveys. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the surface (230) and acquire seismic data in response to various pressure waves emitted by seismic sources. Within the voxels (260), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to field/raw data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot−Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the downgoing wave-field and the receiver wave-field the up-going wave-field.

In Kirchhoff and other migration methods, for example, the imaging condition may include a summation of contributions resulting from the input data traces after the traces have been spread along portions of various isochrones (e.g., using principles of constructive and destructive interference to form the image). For example, a Kirchhoff migration function may be based on an integral form of a wave equation that corresponds to pressure wave displacement and a pressure wave velocity as function of three-dimensional (3D) space and time. As such, 3D Kirchhoff prestack depth migration (PSDM) may be characterized as the summation of various reflection amplitudes along diffraction travel time curves to obtain the output seismic images. As such, Kirchhoff algorithms may preprocess input seismic traces, determine travel time tables for pressure waves using ray-tracing and a velocity model, and migrate these seismic traces. Besides Kirchhoff algorithms, other migration functions are also contemplated such as finite-difference migration, frequency-space migration, frequency-wavenumber migration, and Stolt migration.

Furthermore, seismic data processing may include various seismic data functions that are performed using various process parameters and combinations of process parameter values. For example, a seismic interpreter may test different parameter values to obtain a desired result for further seismic processing. Depending on the seismic data processing algorithm, a result may be evaluated using different types of seismic data, such as directly on processed gathers, normal moveout corrected stacks of those gathers, or on migrated stacks using a migration function. Where structural information of the subsurface is being analyzed, migrated stacks of data may be used to evaluate seismic noise that may overlay various geological boundaries in the subsurface, such as surface multiples (e.g., strong secondary reflections that are detected by seismic receivers). As such, migrated images may be used to determine impact of noise removal processes, while the same noise removal processes may operate on gather data.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Additionally, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes various NMO gathers with amplitudes sampled from a common midpoint (CMP). In particular, a NMO correction may be a seismic imaging approximation based on calculating reflection travel times.

Turning to the seismic interpreter (261), a seismic interpreter (261) (also called a "seismic processing system" or "seismic processor") may include hardware and/or software with functionality for storing the seismic volume (290), well logs, core sample data, and other data for seismic data processing, well data processing, and other data processes accordingly. In some embodiments, the seismic interpreter (261) may include a computer system that is similar to the computer (702) described below with regard to FIG. 7 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Throughout this application, "obtain" and similar terminology is used in the context of actively or passively accessing data, such as seismic data. By way of example, a seismic interpreter may "obtain" a particular type of data (e.g., seismic data, well data, geological data, etc.) by actively transmitting a request to a remote server or a local data store to retrieve the specific data. On the other hand, a computer system may "obtain" data as a passive recipient to the data, such as through a user uploading one or more data files to a local storage device coupled to the computer system that is "obtaining" the data. In contrast, "acquire" and similar terminology is used in the context of actively harvesting data from a physical environment through sensors, electronic receivers (such as seismic receivers), and/or other hardware sensing mechanisms.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
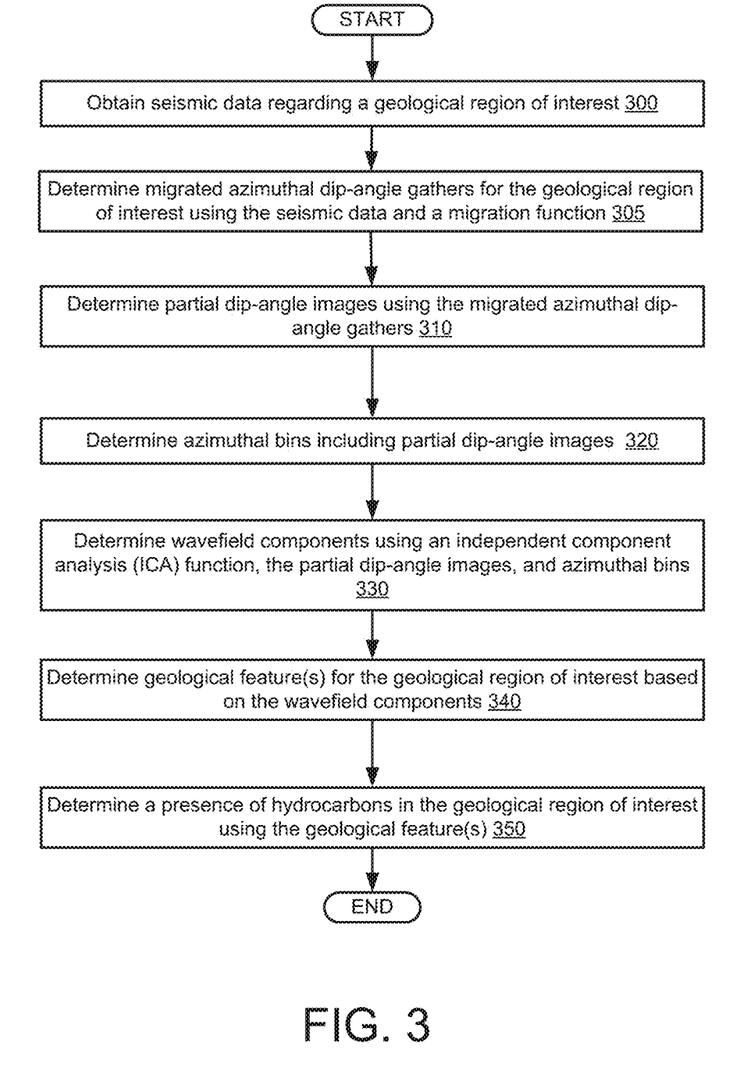
FIG. 3 shows a flowchart in accordance with one or more embodiments.

Turning to FIG. 3, FIG. 3 shows a flowchart in accordance with one or more embodiments. Specifically, FIG. 3 describes a general method for determining wavefield components within seismic data. One or more blocks in FIG. 3 may be performed by one or more components (e.g., seismic interpreter (261)) as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, seismic data are obtained regarding a geological region of interest in accordance with one or more embodiments. A geological region of interest may be a portion of a geological area or volume that includes one or more formations of interest desired or selected for analysis, e.g., for determining location of hydrocarbons or reservoir development purposes. The seismic data may be similar to the seismic data described above in FIGS. 1 and 2 and the accompanying description.

In Block 305, various migrated azimuthal dip-angle gathers are determined for a geological region of interest using seismic data and a migration function in accordance with one or more embodiments. A migrated azimuthal dip-angle gather may describe seismic data in a time or depth domain as a function of multiple dip angle at the point of a reflector. Further, a dip-angle gather may be based on the azimuth angle between the source and receiver, where a 5D migrated azimuthal dip-angle gather corresponding to a time, dip angle, azimuthal angle and common midpoint between source and receiver in two dimensions. More specifically, a migrated azimuthal dip-angle gather may identify an imaged location in a subterranean region. As such, the imaged location may be mapped using different pressure waves spread over a range of dip angles and a range of azimuths.

In some embodiments, for example, an azimuthal dip-angle gather describes seismic contributions of a predetermined set of seismic traces at an imaged location. For a given input trace and a given image point, the angle attributes can be classified into scattering angles ($\alpha$), a geological dip angle, a migration dip angle ($\Theta$) and an azimuthal angle ($\varphi$). The scattering angle are the half angle between source and receiver rays. The dip angle describes the direction of illumination for a given scattering angle.

Figure 4:
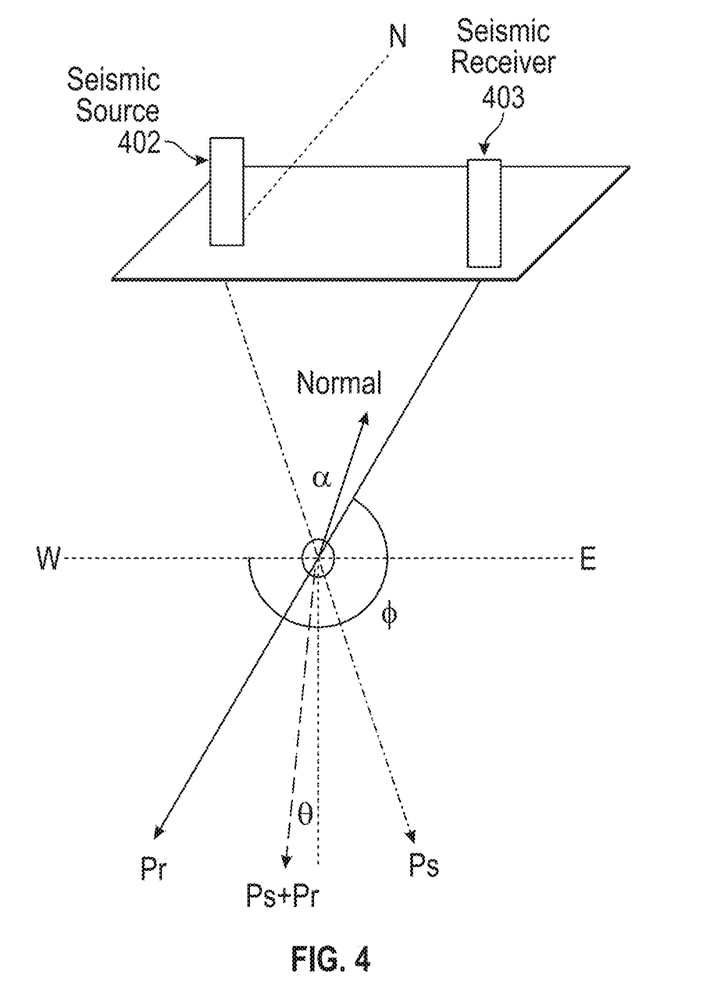
FIGS. 4, 5, and 6 show examples in accordance with one or more embodiments.

Turning to FIG. 4, FIG. 4 illustrates a dip angle X at an imaged location on a subsurface reflector with a reflector normal for a seismic source (402) and a seismic receiver (403). As shown in FIG. 4, a pressure wave intersects the subsurface reflector, where the pressure wave corresponds to a source-side slowness vector and a receiver-side slowness vector. For example, slowness vectors may refer to different subsurface layers exhibiting different densities. The migrated dip angle corresponds to a direction that is orthogonal to the slowness vector.

Returning to FIG. 3, in Block 310, various partial dip-angle images are determined using various migrated azimuthal dip-angle gathers in accordance with one or more embodiments. In some embodiments, a 5D dip-angle gather is separated into different partial dip-angle images that include respective stacks for different dip angles. As such, a partial dip-angle image may correspond to a single dip-angle value, while the original dip-angle gather may correspond to a range of dip-angle values. Likewise, the migration function may be a Kirchhoff prestack time imaging function that generates various azimuthal dip-angle gathers. However, other migration functions are contemplated as well, as described above in FIGS. 1 and 2 and the accompanying description.

In Block 320, various azimuthal bins are determined that include one or more partial dip-angle images in accordance with one or more embodiments. In particular, the partial dip-angle images may be further arranged according to different azimuthal bins. In some embodiments, for example, various dip-angles are divided into five partial stacks for a particular azimuthal bin having a span of 10° from 0° to 50° to enhance the seismic events in each azimuth. Upon analyzing a particular dip angle gather, for example, a source-receiver offset may be determined that produce equal-sized azimuthal bins. As such, these predetermined azimuthal bins may enhance and/or preserve diffraction energy within the migrated image data.

In Block 330, wavefield components are determined using an independent component analysis (ICA) function and one or more partial dip-angle images in accordance with one or more embodiments. More specifically, an ICA function may reduce the dimensionality of the migrated data and separate different wavefields based on different components within a noisy dip-angle gather. In particular, ICA functions may correspond to higher order statistical techniques that may separate a multivariate signal into independent components. For example, an ICA function may be various vector operators and/or matrix operators to determine a solution to the independent and separate signals within observed data. Some example ICA functions include a projection pursuit technique, a redundancy reduction technique, a blind deconvolution technique, contrast functions, a linear independent component analysis, and various ICA techniques that use an objective function in connection with an optimization method or search method. In other words, the partially stacked migrated azimuthal dip-angle gather data may be assumed to be a linear combination of different contributing variables to the migrated seismic data.

In some embodiments, the ICA function identifies various independent components corresponding to estimated source signals within a particular azimuthal bin. The independent components may be latent variables. As latent variables, the independent components within a partial dip-angle image may not be directly observable. Examples of the independent components may include a reflection component, a first random noise component, a coherent noise component, a second random noise component, and/or a seismic lineament component for diffractions.

For illustration, independent component analysis may describe a vector of input data x such that the vector of input data satisfies the following equation:

$$x = As \qquad \text{Equation 1}$$

where A is an unknown "mixing" matrix, such as the subsurface matrix that describes pressure wave propagation and scattering based on various subsurface reflectors and s corresponds to various source signals (e.g., the primary pressure wave, coherent or incoherent noise, etc.) that are statistically independent from each other. In some embodiments, for example. The mixing matrix may correspond to a convolutive mixing model. As such, an ICA function may use an ICA model (e.g., Equation 1) that describes how observed seismic data is generated at an imaged location during a seismic survey. As such, the linear framework in Equation 1 may being used to describe a relationship between observed seismic data x that corresponds to the partial dip-angle image data and various contributing signals detected by seismic data for an imaged location. Likewise, the ICA function may be a FastICA algorithm, where the FastICA algorithm is based on a fixed-point iteration scheme.

Figure 5:
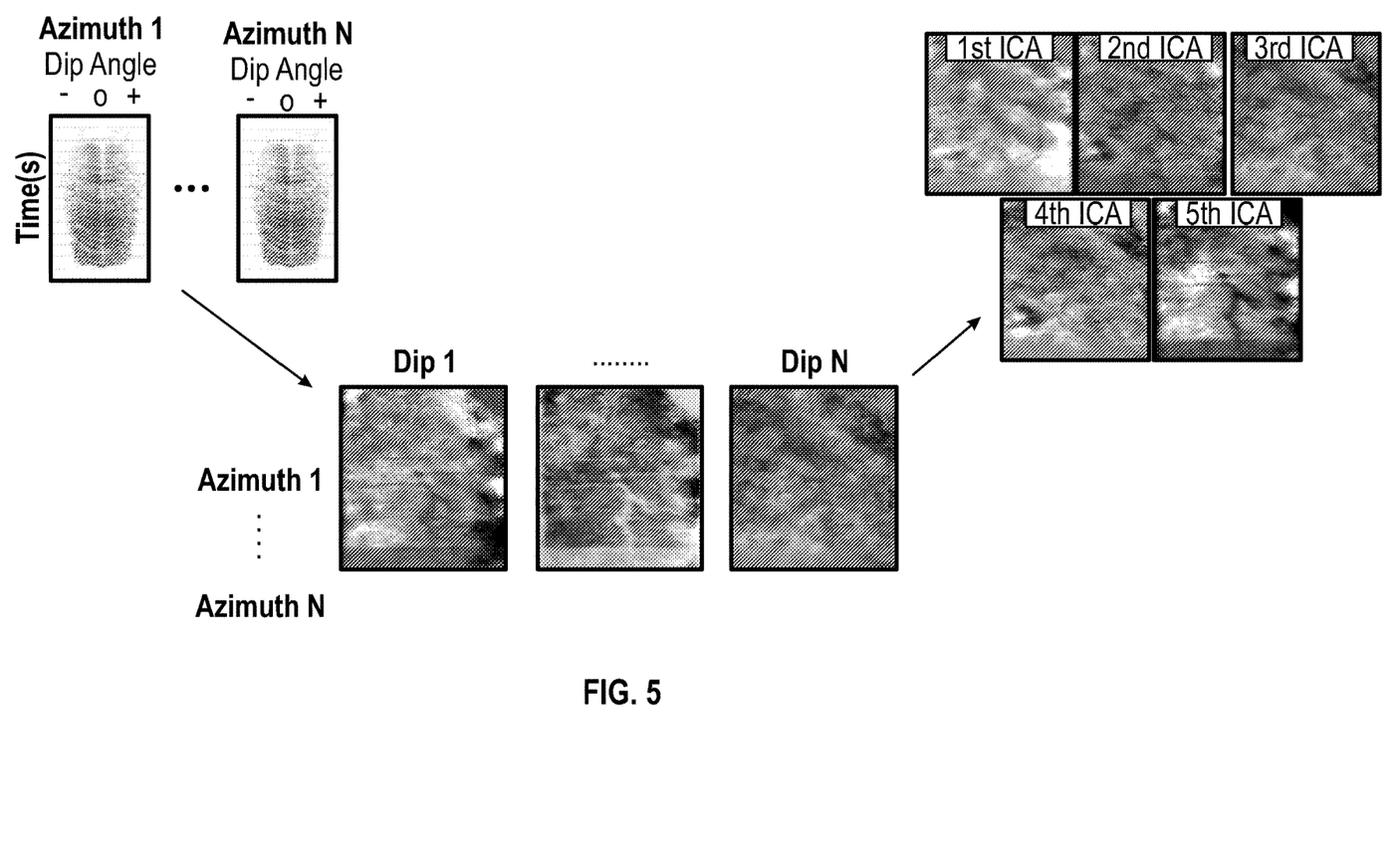

Turning to FIG. 5, FIG. 5 illustrates an example of generating various independent components based on the migrated azimuthal dip-angle gathers. In FIG. 5, the seismic data is migrated into various azimuthal dip angles. In particular, the migrated azimuthal dip-angle gathers may describe seismic data for a particular imaged location as a function of the time domain, migration dip angles, and azimuth. Using the migrated azimuthal dip-angle gather, multiple partial dip-angle images may be produce using a stacking function organized according to an N number of images in an N number of azimuthal bins. Next, an independent component analysis (ICA) function is applied to various partial dip-angle stacks to multiple different ICA components for each azimuthal bin.

Returning to FIG. 3, in Block 340, one or more geological features are determined for a geological region of interest based on various wavefield components in accordance with one or more embodiments. For example, the wavefield components may be used to identify one or more diffraction events within the subsurface. In particular, seismic diffractions may produce by an acoustic impedance contrast based on geological features, such as faults, fractures, channels, rough edges of salt structures, and karst sections. As such, a seismic lineament component determined using an ICA function may be mapped to the geological region of interest, e.g., to determine an orientation of the particular diffraction event. By analyzed a seismic lineament component, for example, the temporal extent of the geological feature may be identified accordingly. Moreover, diffraction hyperbolic patterns may occur in various seismic section as evidence of abrupt discontinuities in the subsurface reflector geometry. Likewise, diffraction events may include "point" diffractors as well as reflector edges.

In some embodiments, the wavefield components may highlight various weakness zones in the geological region of interest. For example, a seismic interpreter may fine-tune the azimuthal and dip to match drilling data from one or more drilling operations. By identifying zone of weakens in one or more geological regions, drilling operations, completion operations, and fracking operation may be improved accordingly. For example, identifying geological features based on the wavefield components may be used to enhance well placement, target sealed formations, and/or design various fracking operations. By drilling through a weakness zone in a geological region of interest, drilling parameters may be determined that optimize the drilling operation and reduce drilling risks. In some embodiments, the identified geological features are correlated with other well data, such as well logs, fracture intensity, drilling parameters and well performance.

In Block 350, a presence of one or more hydrocarbon deposits are determined in a geological region of interest based on one or more geological features in accordance with one or more embodiments. In some embodiments, information regarding the geological features may be used for various practical applications. For example, the geological features may be used to predict hydrocarbon deposits, predict well paths for geosteering, etc.

Moreover, fracture imaging may provide an important tool for oil and gas exploration, such as in direction drilling. However, complex subsurface geometries such as fractures and faults may have low-impedance contrasts in a seismic image of a particular geological region. Because these small-scale discontinuities may present themselves in seismic data in the form of diffraction events with diffracted waves. Thus, proper imaging of diffractions may be performed using independent component analysis to obtain valuable subsurface attributes that compliment other reflection imaging techniques. For unconventional drilling targets, mapping areas in the subsurface with these low-impedance contrasts may offer potential drilling opportunities for optimizing drilling costs and mitigate drilling risks.

In some embodiments, an automated drilling manager transmits one or more commands to various control systems. For example, the commands may produce drilling operations with specific drilling parameters. On the other hand, the commands may be used to implement a predetermined well path based on the geological features detected from various wavefield components. Likewise, an automated drilling manager may be coupled to a seismic interpreter, e.g., over a network. Drilling parameters may also include data that describes drill string properties, such as a specific weight-on-bit or rate of penetration (ROP) values. Commands may include data messages transmitted over one or more network protocols using a network interface, such as through wireless data packets. Likewise, a command may also be a control signal, such as an analog electrical signal, that triggers one or more operations in a particular control system. Moreover, a user or an automated drilling manager may select adjust drilling operations or drilling parameters based on different diffraction events within a subsurface.

Figure 7:
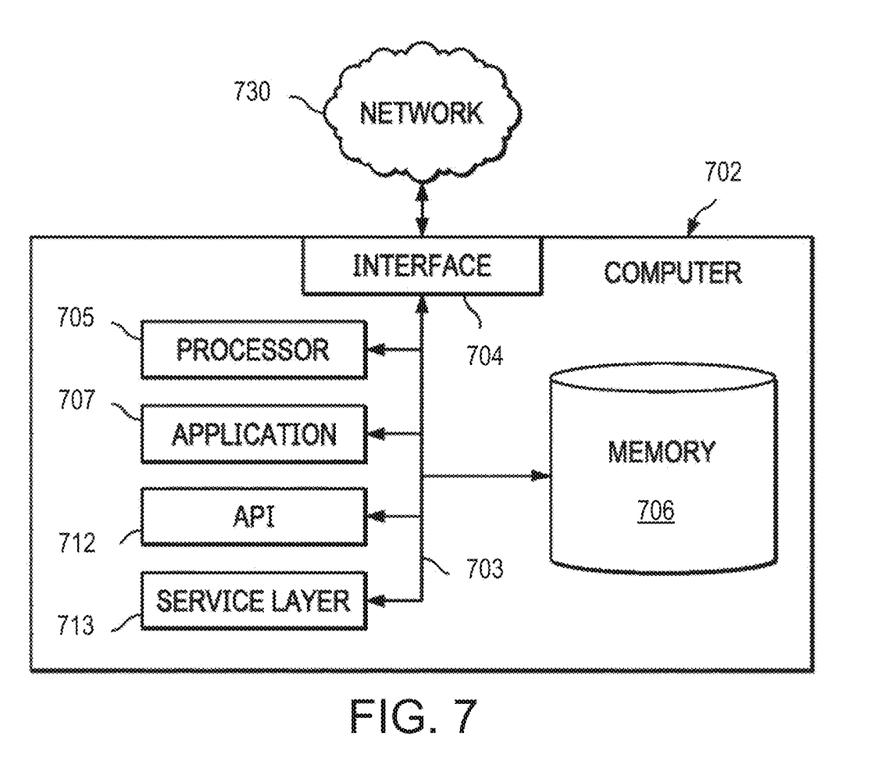
FIG. 7 shows a computing system in accordance with one or more embodiments.

The automated drilling manager may be similar to computer system (702) described below in FIG. 7 and the accompanying description.

Figure 6:
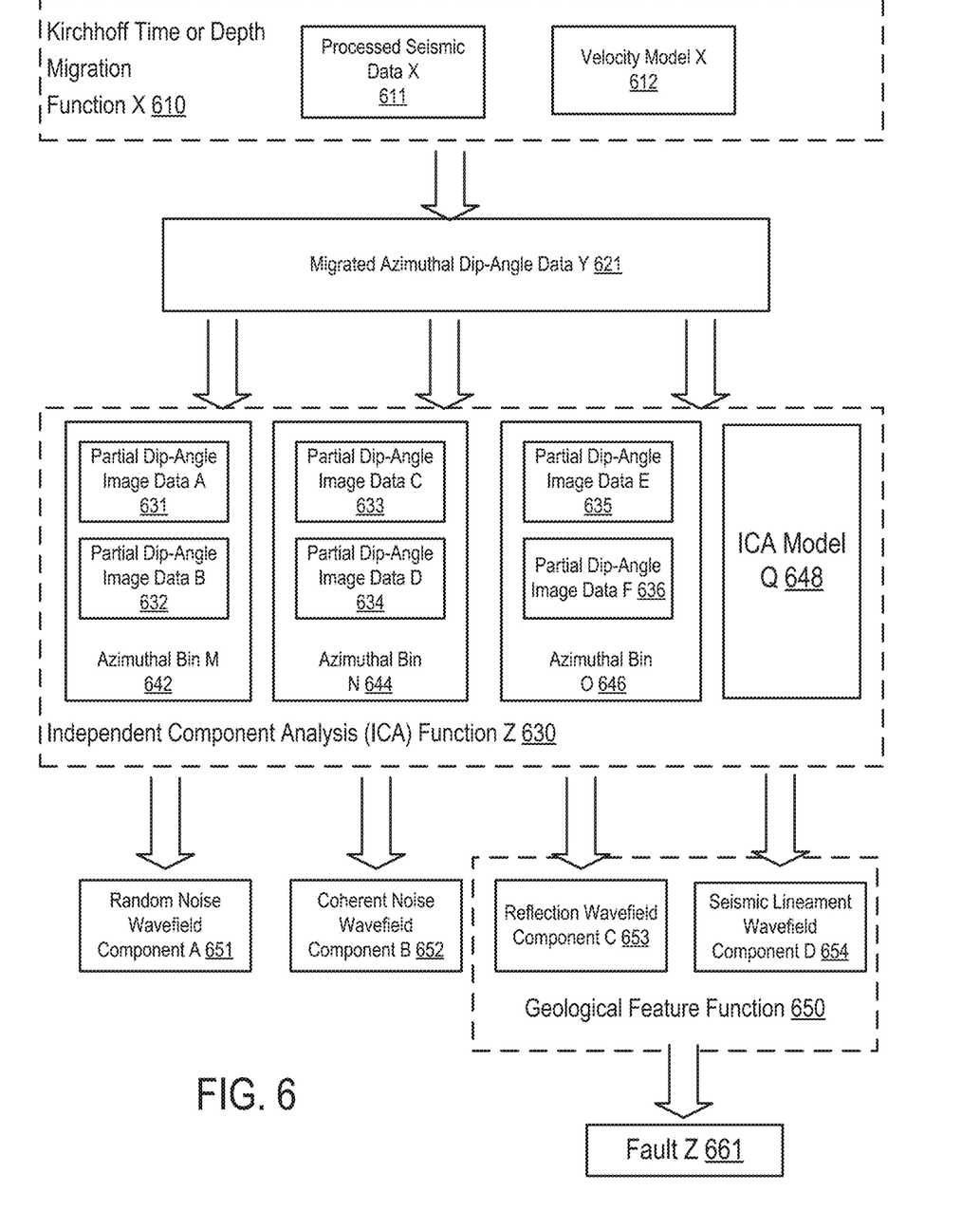

Turning to FIG. 6, FIG. 6 provides an example of determining a well path based on various wavefield components in accordance with one or more embodiments. The following example is for explanatory purposes only and not intended to limit the scope of the disclosed technology. In FIG. 6, a seismic interpreter (not shown) obtains processed seismic data X (611) based on a seismic survey for a geological region X and a velocity model X (612) that describes the geological region X. Using a Kirchhoff time/depth migration function X (610), the seismic interpreter uses the processed seismic data X (611) and the velocity model X (612) as inputs to determine migrated azimuthal dip-angle data Y (621). In this process, the seismic processers choose the appropriate binning in dip-angle and azimuthal dimensions, i.e., azimuthal bin M (642), azimuthal bin N (644), and azimuthal bin O (646). Partial dip-angle azimuthal image data A (631) and partial dip-angle azimuthal image data B (632) are located in azimuthal bin M (642). Partial dip-angle azimuthal image data C (633) and partial dip-angle azimuthal image data D (634) are located in azimuthal bin N (644). Likewise, partial dip-angle azimuthal image data E (635) and partial dip-angle azimuthal image data F (636) are located in azimuthal bin O (646). For example, different partial dip-angle azimuthal image data may correspond to migrated seismic data for different migrated dip angles.

Keeping with FIG. 6, the seismic interpreter applies an independent component analysis (ICA) function Z (630) to the azimuthal bins (642, 644, 646) using the ICA model Q (648) to determine four wavefield components. In particular, the output of the ICA function Z (630) is a random noise wavefield component A (651), a coherent noise wavefield component B (652), a reflection wavefield component C (653), and a seismic lineament wavefield component D (654). Here, a seismic interpreter may use the reflection wavefield component C (653) and the seismic lineament wavefield component D (654) in a geological feature function (650), which determines that a fault Z (661) is disposed at the imaged location in geological region X. Finally, the seismic interpreter, a reservoir simulator, an automated drilling manager, or a drilling control system may use information relating to fault Z (661) to determine a well path or a presence of hydrocarbons in geological region X.

Computer System

Embodiments may be implemented on a computer system. FIG. 7 is a block diagram of a computer system used to provide computational functionalities associated with described algorithms, methods, functions, processes, flows, and procedures as described in the instant disclosure, according to an implementation. The illustrated computer (702) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730) or cloud. In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) or cloud from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704 includes logic encoded in software or hardware (or a combination of software and hardware) and operable to communicate with the network (730) or cloud. More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), each computer (702) communicating over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

In some embodiments, the computer (702) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
    determining, by a computer processor, a plurality of migrated azimuthal dip-angle gathers based on a migration function and seismic data from a seismic survey regarding a geological region of interest;
    determining, by the computer processor, a plurality of partial dip-angle images using the plurality of migrated azimuthal dip-angle gathers;
    determining, by the computer processor, a plurality of azimuthal bins comprising the plurality of partial dip-angle images;
    determining, by the computer processor, a plurality of wavefield components using an independent component analysis (ICA) function and the plurality of partial dip-angle images among the plurality of azimuthal bins; and
    determining, by the computer processor, a geological feature within the geological region of interest using the plurality of wavefield components.

2. The method of claim 1, further comprising:
    obtaining an ICA model comprising a mixing matrix corresponding to an imaged location in the geological region of interest,
    wherein determining the plurality of wavefield components comprising using the ICA function to determine a solution to the ICA model and the plurality of partial dip-angle images, and
    wherein the ICA function is a statistics function.

3. The method of claim 1,
    wherein a migrated azimuthal dip-angle gather among the plurality of migrated azimuthal dip-angle gathers corresponds to a plurality of seismic contributions at an imaged location in the geological region of interest, the migrated azimuthal dip-angle gather being a function of time and dip angles for a subsurface reflector.

4. The method of claim 1,
    wherein the plurality of wavefield components comprise a reflection component, a first random noise component, a coherent noise component, a second random noise component, and a seismic lineament component for diffractions.

5. The method of claim 1,
    wherein the migration function is a Kirchhoff depth migration function.

6. The method of claim 1,
    wherein the geological feature corresponds to a diffraction event that is selected from a group consisting of a fault, a fracture, a channel, a rough edge of a salt body, and a karst section.

7. The method of claim 1, further comprising:
    determining, using the geological feature, a predetermined well path through the geological region of interest; and
    transmitting, using a control system, a command to perform a drilling operation based on the predetermined well path.

8. The method of claim 1, further comprising:
    determining, using the geological feature, a presence of hydrocarbons in the geological region of interest.

9. The method of claim 1, further comprising:
    acquiring, using a seismic surveying system, the seismic data regarding the geological region of interest.

10. A system, comprising:
    a control system; and
    a seismic interpreter comprising a computer processor, the seismic interpreter coupled to the control system and comprising functionality for:
        determining a plurality of migrated azimuthal dip-angle gathers based on a migration function and seismic data from a seismic survey regarding a geological region of interest;
        determining a plurality of partial dip-angle images using the plurality of migrated azimuthal dip-angle gathers;
        determining a plurality of azimuthal bins comprising the plurality of partial dip-angle images;
        determining a plurality of wavefield components using an independent component analysis (ICA) function and the plurality of partial dip-angle images among the plurality of azimuthal bins; and
        determining a geological feature within the geological region of interest using the plurality of wavefield components,
    wherein the control system is configured to transmit a command during a drilling operation based on the geological feature.

11. The system of claim 10, wherein the seismic interpreter further comprises functionality for:
    obtaining an ICA model comprising a mixing matrix corresponding to an imaged location in the geological region of interest,
    wherein determining the plurality of wavefield components comprising using the ICA function to determine a solution to the ICA model and the plurality of partial dip-angle images, and
    wherein the ICA function is a statistics function.

12. The system of claim 10,
    wherein a dip-angle gather among the plurality of dip-angle gathers corresponds to a plurality of seismic contributions at an imaged location in the geological region of interest, the dip-angle gather being a function of time and dip angles for a subsurface reflector.

13. The system of claim 10,
    wherein the plurality of wavefield components comprise a reflection component, a first random noise component, a coherent noise component, a second random noise component, and a seismic lineament component for diffractions.

14. The system of claim 10,
    wherein the migration function is a Kirchhoff depth migration function.

15. The system of claim 10,
    wherein the geological feature corresponds to a diffraction event that is selected from a group consisting of a fault, a fracture, a channel, a rough edge of a salt body, and a karst section.

16. The system of claim 10, wherein the seismic interpreter further comprises functionality for:
  determining, using the geological feature, a predetermined well path through the geological region of interest.

17. The system of claim 10, wherein the seismic interpreter further comprises functionality for:
  determining, using the geological feature, a presence of hydrocarbons in the geological region of interest.

18. The system of claim 10, further comprising:
  a seismic surveying system, wherein the seismic surveying system comprises at least one seismic source and a plurality of seismic receivers,
  wherein the seismic surveying system acquires the seismic data.

19. A non-transitory computer readable medium storing instructions executable by a computer processor, the instructions comprising functionality for:
  determining a plurality of migrated azimuthal dip-angle gathers based on a migration function and seismic data from a seismic survey regarding a geological region of interest;
  determining a plurality of partial dip-angle images using the migrated azimuthal dip-angle gathers;
  determining a plurality of azimuthal bins comprising the plurality of partial dip-angle images;
  determining a plurality of wavefield components using an independent component analysis (ICA) function and the plurality of partial dip-angle images among the plurality of azimuthal bins; and
  determining a geological feature within the geological region of interest using the plurality of wavefield components.

20. The non-transitory computer readable medium of claim 19, wherein the instructions further comprise functionality for:
  obtaining an ICA model comprising a mixing matrix corresponding to an imaged location in the geological region of interest,
  wherein determining the plurality of wavefield components comprising using the ICA function to determine a solution to the ICA model and the plurality of partial dip-angle images, and
  wherein the ICA function is a statistics function.

* * * * *